United States Patent Office 2,978,972
Patented Apr. 11, 1961

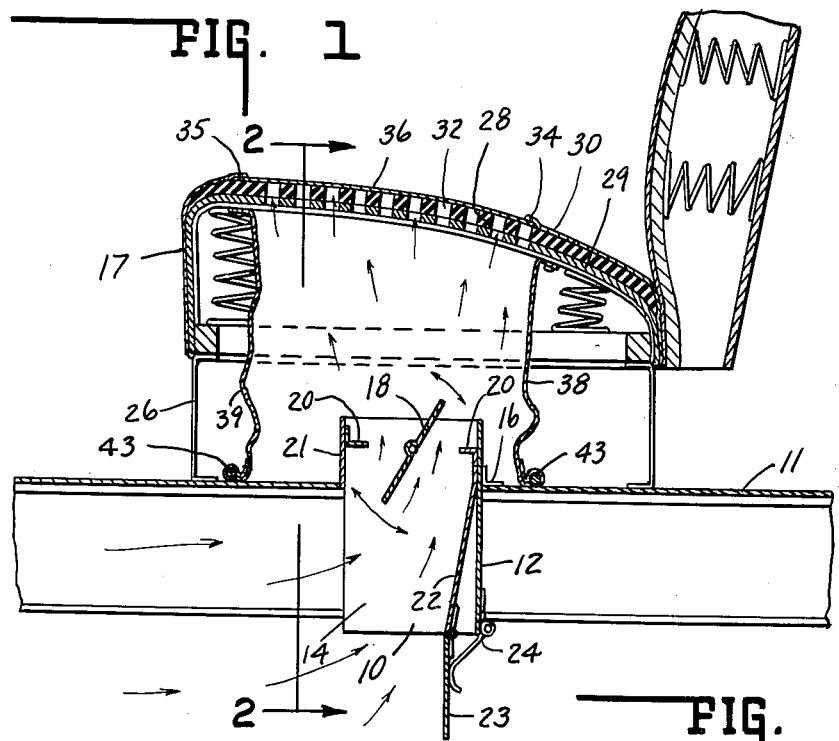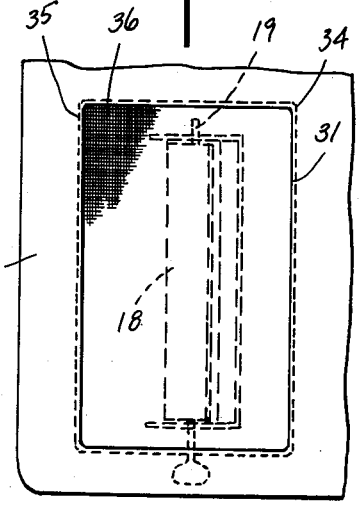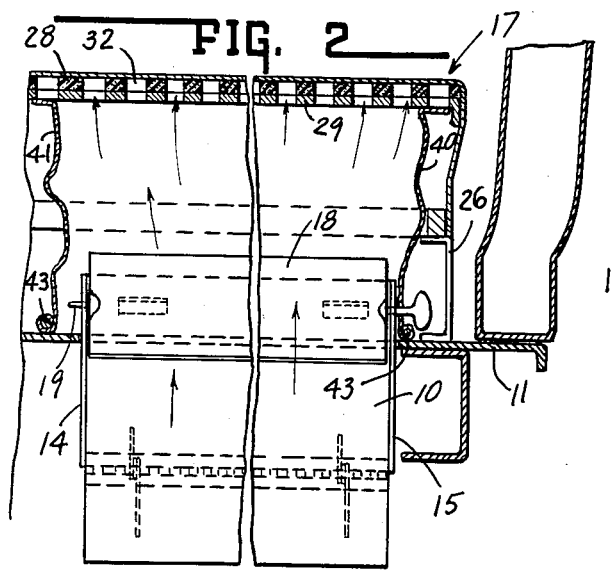

2,978,972
VENTILATING AND COOLING SYSTEM FOR AUTOMOBILE SEATS
Wesley F. Hake, 2900 College Ave., Terre Haute, Ind.
Filed Nov. 3, 1958, Ser. No. 771,411
4 Claims. (Cl. 98—2)

This invention relates generally to a system for ventilating and cooling automobile seats, and more particularly, it relates to such a system which is particularly adapted for cooling the driver's seat in an automobile.

The prior art suggests several devices for cooling articles of furniture such as chairs and also the seats of automobiles. Those systems which have been adapted for cooling of furniture comprise refrigeration and air circulating devices which are not adaptable economically or mechanically to the conventional seat structure of automobiles. The prior systems, as provided for automobile seats, inherently are not readily adaptable to adjustable automobile seats due to the fact that these devices include parts which have the effect of fixing the position of the automobile seat relative to the car body. Conventional systems are also limited with respect to the volume of air which may be circulated for cooling purposes.

Accordingly, the principal object of this invention is to provide a ventilating and cooling system for automobile seats which may readily be installed in conventional automobile bodies without impairing, in any way, the adjustment of the automobile seat and which is adapted to circulate a relatively large volume of air for ventilating and cooling purposes.

This invention provides a ventilating and cooling system for automobile seats consisting of an air scoop mounted in the floor of the automobile beneath the seat to be cooled for collecting and discharging air in response to motion of the automobile, a duct having walls of flexible material and extending between the floor of the automobile and the seat thereof, and a section within the cushion of said seat having air venting holes therein, whereby air is free to circulate through the cushion of said seat.

The full nature of the invention will be understood from the accompanying drawings and the following description and claims.

Fig. 1 is a transverse section of an automobile seat incorporating this invention.

Fig. 2 is a longitudinal cross section taken on line 2—2 of Fig. 1.

Fig. 3 is a partial top plan view of the seat illustrated in Fig. 1.

The ventilating and cooling system of this invention comprises an air scoop 10 mounted to project above and below the floor 11 of an automobile. The scoop 10 comprises a rear wall 12 and sidewalls 14 and 15, all of which may be fixed by means of conventional angle irons, such as 16, to floor 11 in such a manner as to project below floor 11 a sufficient distance to collect and guide air from beneath the automobile into the area beneath the automobile seat 17. The front side of scoop 10 may be completely open and a damper 18 may be rotatably mounted within the upper end of the scoop on a rod 19 extending through holes in sidewalls 14 and 15. Damper 18 may be opened to the position illustrated in Figs. 1 and 2 or may be rotated into horizontal position to close with inwardly projecting lip members 20 whereby circulation of air may be prevented when cooling of the automobile seat is not necessary. It will be noted that scoop 10 is provided with a front wall 21 extending inwardly and upwardly of the floor 11 whereby damper 18 is effective to seal the inside of the automobile from the outer air.

In order to increase the efficiency of scoop 10, it may be provided with a slanting rear wall 22 to the lower end of which may be hinged a flexible flap 23 biased in a forward direction by means of a spring member 24. Flap 23 serves to increase the quantity of air collected by the scoop but is pivotally mounted so that it may swing rearwardly of the automobile if it hits a portion of the roadway or some object on the roadway.

The automobile seat 17 may be of conventional construction and may be slidably mounted on a rectangular box structure 26. No structure is shown for slidably mounting seat 17, as such structure is well known in the art. The cushion portion of seat 17 includes a conventional spring structure adapted to support a foam rubber or similar pad 28. Pad 28 may be supported on a flexible backing member 29 and may be provided with a covering material 30 such, for example, as woven nylon having a relatively porous structure.

When this invention is incorporated in a new automobile by the manufacturer, the pad 28 and the covering 30 may be formed of continuous pieces of material, but when the invention is incorporated in a previously manufactured automobile, the normally continuous foam rubber pad 28 may be cut to provide a rectangular opening as illustrated at 31 in Fig. 3. A section of foam rubber padding having air conducting apertures 32, may then be inserted in the rectangular opening and supported on the backing member 29. This member may also have similar holes cut therein so that air may travel through the entire cushion. The covering material 30 may be sewn as at 34 and 35 so that the inserted section of foam rubber may be covered with a panel 36 of porous material.

For conducting air entering through the scoop 10 to the aperture section of the seat, there are provided front and rear flexible wall members 38 and 39 and flexible sidewall members 40 and 41 joined to one another at adjacent sides to form a duct. The upper ends of the wall members may be cemented or otherwise secured to the backing member 29, as shown in Figs. 1 and 2, and the lower ends of the walls may be attached to rods 43 which serve as weights to effect a seal between the lower end of the duct and the floor of the automobile. It will be noted that each of the wall members of the duct is greater in length than the distance between the backing member 29 and the floor of the automobile. This insures that the duct member will engage the floor of the automobile even though the automobile seat may be moved in a backward or forward direction.

From the foregoing description it will readily be apparent that this invention provides a ventilating and cooling system adapted to circulate relatively large quantities of air through an automobile seat cushion and that efficiency of the system will not be impaired by adjustment of the seat with respect to the floor of the automobile. Also the structure of the system is of such character that it may be added to automobiles after they have been manufactured without the necessity of extensive alteration of the automobile structure.

The invention claimed is:

1. An automobile seat ventilating system comprising an air scoop adapted to be mounted on and extend through the floor of an automobile beneath a seat therein, a duct consisting of four walls formed of flexible material and adapted to be hung from said seat over said scoop, said walls each including a weight at the bottom edge thereof for holding said edge in movable contact and sliding relation to said floor, and a cushion member aligned with said duct and having air venting holes therein for passing air entering said scoop.

2. An automobile seat ventilating system comprising an air scoop adapted to be mounted on and extend through the floor of an automobile beneath a seat therein, a duct consisting of four walls adapted to be hung from said seat over said scoop, said walls each extending into movable contact and sliding relation to said floor, and a cushion member aligned with said duct and having air venting holes therein for passing air entering said scoop.

3. An automobile seat ventilating system comprising means extending through the floor of an automobile beneath a seat therein for collecting air, said seat being adjustable as to position with respect to said means, a duct adapted to be hung from said seat over said means, said duct being formed to be movable with said seat and extending into movable contact and sliding relation with said floor and a cushion member aligned with said duct and having air venting holes therein for passing air entering said means.

4. An automobile seat ventilating system comprising an air scoop adapted to be mounted on and extend through the floor of an automobile beneath a seat therein, a tubular duct adapted to be hung from said seat over said scoop, said duct extending into movable contact and sliding relation to said floor, and a cushion member aligned with said duct and having air venting holes therein for passing air entering said scoop.

References Cited in the file of this patent

UNITED STATES PATENTS

| | | |
|---|---|---|
| 1,475,912 | Williams | Nov. 27, 1923 |
| 2,022,959 | Gordon | Dec. 3, 1935 |
| 2,663,243 | Wunderlich | Dec. 22, 1953 |
| 2,703,134 | Mossor | Mar. 1, 1955 |
| 2,775,927 | Wulle | Jan. 1, 1957 |